March 21, 1939.     W. SCHWARTZ ET AL     2,151,236
ILLUMINATED SCREEN
Filed April 8, 1937
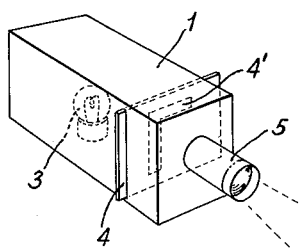
Fig. 1
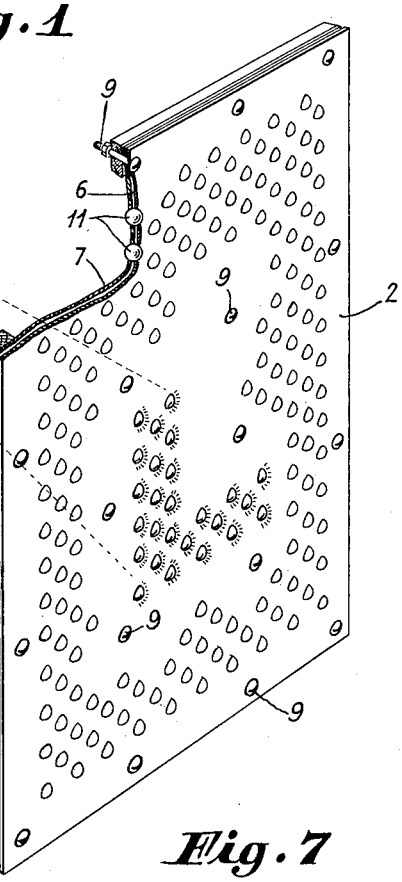
Fig. 2
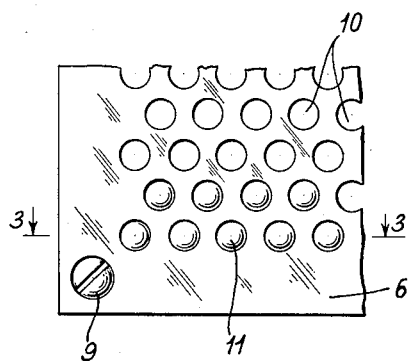
Fig. 3
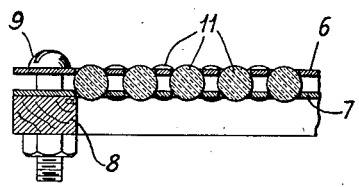
Fig. 5
Fig. 4
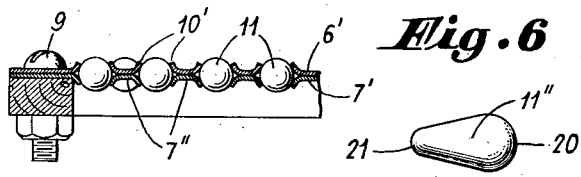
Fig. 6
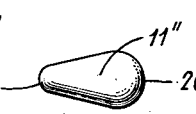
Fig. 7
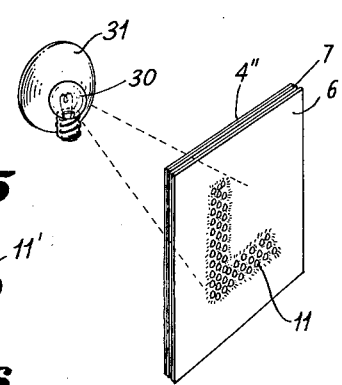
INVENTORS
WILLIAM SCHWARTZ
MURAY SCHWARTZ
BY Abraham S. Greenberg
ATTORNEY Patented Mar. 21, 1939

2,151,236

UNITED STATES PATENT OFFICE 2,151,236

ILLUMINATED SCREEN

William Schwartz and Muray Schwartz, New York, N. Y., assignors of one-third to Francis J. Wallenberger, Buffalo, N. Y.

Application April 8, 1937, Serial No. 135,653

4 Claims. (Cl. 88—24)

Our present invention relates generally to image projection systems, and more particularly to an image projection system employing a novel and highly improved type of illuminated screen.

In the past there have been proposed different types of screens, or signs, which when illuminated according to some predetermined pattern reproduce the latter. Such past screens, or signs, have usually employed incandescent lamps adapted to be energized by relatively complicated electrical control circuits; they have, also, been constructed of expensive and complex lenses when the pattern to be reproduced is projected on the screen. Finally, illuminated screens, or signs, have been employed in the past which use lens assemblies in fixed and unchangeable patterns; such signs being of little value where continuously changing illuminated patterns are desired. For color, or half-tone, effects, these prior devices require special and uneconomical equipment.

Accordingly, it may be stated to be one of the primary objects of our present invention to provide a screen, or sign, device constructed and arranged to reproduce any desired illuminated pattern, whether in black and white or half-tone or color effects; and the screen essentially comprising a plurality of vertically and horizontally aligned light transmitting and concentrating elements which cooperate to reproduce in a brightly illuminated fashion a desired pattern when light rays from an illuminated pattern fall on the screen elements.

Another important object of our invention is to provide a novel method of reproducing a desired pattern, which method includes the steps of illuminating the pattern, then permitting the light rays from the illuminated pattern to fall on a plurality of spaced elements capable of transmitting and concentrating the light rays in such a manner that the pattern is brilliantly reproduced by those of the spaced elements illuminated.

Another object of the invention is to provide a screen, or sign, device constructed of a plurality of spaced light concentration elements; the elements being arranged in a bank of vertically and horizontally aligned rows whereby light rays falling on the elements in any predetermined pattern cause the reproduction of the pattern on the screen.

Still another object of the invention may be stated to reside in the provision of a screen device capable of reproducing thereon still, or animated, images of letters, words, sentences or pictures; and the screen being essentially constructed of a plurality of spaced globular light concentration elements arranged in vertically and horizontally aligned rows; and the globular elements being maintained fixedly in spaced position by being secured between a pair of rigid plates which are perforated to receive the globular elements.

Yet other objects of the invention are to improve generally the image reproduction efficiency of illuminated screens, and more especially to provide multi-globular screens, or signs, which are readily and easily manufactured and assembled.

The novel features which we believe to be characteristic of our invention are set forth in particularity in the appended claims; the invention itself, however, as to both its organization and method of operation will best be understood by reference to the following description taken in connection with the drawing in which we have indicated diagrammatically several constructions whereby our invention may be carried into effect.

In the drawing:

Fig. 1 shows a projection system embodying a screen constructed according to our invention; a portion of the screen being cut away, Fig. 2 is a detail view of a corner of the screen, Fig. 3 is a section taken along line 3—3 of Fig. 2, and looking in the direction of the arrows, Fig. 4 is a sectional view, similar to Fig. 3, showing a modified screen construction, Fig. 5 shows a modified form of globular light concentration element, Fig. 6 shows another form of globular element, Fig. 7 schematically represents a modified projection system employing the screen of Fig. 1.

Referring now to the accompanying drawing, wherein like reference characters in the different figures designate similar constructional elements, the projection system of Fig. 1 generally comprises a projector 1 and a screen 2. The projector, entirely conventional in construction, will comprise a source of light 3; a film 4, either positive or negative; and the optical elements 5. To preserve simplicity of disclosure, and also because the more complex types of projectors are fully known, the projector 1 is shown simply as employing a slide 4 with the letter L. The screen 2, in general, comprises a pair of parallel rigid plates 6 and 7 fixedly secured at the edges thereof to wooden bars 8; bolts 9 being used for this purpose. Each plate is provided with a plurality of circular apertures 10; the latter being arranged in vertical, horizontal and diagonal rows. It will be further observed that the apertures, or perforations, in each plate are in staggered relation as far as the successive rows are concerned. Between each pair of opposed apertures is disposed a globular element 11. For example, the element 11 may be a glass sphere, or ball. Since the apertures 10 of one plate are in registration with those of the other plate, the globular elements 11 will be arranged in vertical, horizontal and diagonal alignment when clamped in position between the rigid plates. In Fig. 3 is shown the specific manner in which each glass sphere 11 is fixedly positioned between a pair of opposed apertures 10. It will be seen that a relatively small space separates each pair of successive spheres, and that on either face of plates 6 and 7 there is visible a portion of the surface of a sphere. In order to positively and securely maintain the spheres 11 in immovable position between the opposed rigid plates 6 and 7, bolts 9 may be employed at predetermined points of the plates such that maximum compression on the spheres is secured; in Fig. 1 the bolts 9 are indicated as being freely spaced, but it will be understood that the number of bolts to be used will depend on the number of spheres per unit area of supporting plates.

The cut away section of the screen 2 in Fig. 1 shows the spaced appearance of the locking plates when the spheres are in place. It will be seen that the spheres 11 project somewhat beyond each exposed face of plates 6 and 7. Fig. 1 does not show all the spheres, but it will be understood that each pair of opposed apertures actually has a sphere therebetween. To prevent unnecessary complication of drawing, only the outer margin of spheres are shown, and those spheres illuminated by the light rays 12 are shown at the central section of the screen. It is to be understood that the area between the marginal spheres and illuminated spheres is also provided with spheres; the dotted cross marks in this intermediate area designate points at which the additional spheres are located.

Considering Figs. 2 and 3 in detail, it will be seen that the diameter of each aperture 10 is less than the diameter of a sphere 11. The diameter of an aperture 10 will depend on the area of sphere to be exposed on each face of the locking plates. Again, the sphere sizes, and spacing between spheres, will depend on the size of screen and the degree of image detail desired. Obviously, for moving pictures, or animated cartoons, detail is required to a much greater extent than for words; hence in the former case, the spheres 11 will be smaller in diameter and closely spaced so as to provide more light points per screen area.

The locking plates may be of any rigid material, for example, steel, brass, copper, sheet tin, in fact, any rigid material which can be punched, or bored, to provide the apertures 10, and can be subjected to the clamping action of spaced bolts 9. Of course, the exposed faces of plates 6 and 7 are coated with a black coating so that minimum reflection of light therefrom occurs. The locking plates need not have the perforations in a rectangular pattern; they may be in any other geometric configuration so that the spheres will be arranged accordingly. In this way the area to be illuminated may assume a rectangular, circular, elliptical, or any other shape.

The globular elements 11, described above as glass spheres, may assume different shapes. For example, in Fig. 5 is shown an ellipsoidal element 11' which may be used in place of the glass sphere. Fig. 6 shows a complex element 11" which may be substituted for the sphere. The element 11" has a semi-spherical section 20 upon which the light rays fall; the viewing, or forward, section 21 is substantially parabolic. In Fig. 5, of course, the rear and forward sections are tapered. While these shapes are preferred, it is possible to use light concentrating globules of still other configurations. The viewing, or forward, section of the globule should be capable of condensing, or concentrating, the light falling thereon so that the viewing section acts ideally as a light point source.

While glass has been specified as the material for the globules 11, it is to be understood that other light transmitting materials may be employed. For example, quartz, or other naturally occurring minerals, may be utilized. Again, synthetic resins, or phenol condensation products, which are capable of efficiently transmitting light, may be used. If desired, the globules may be colored so that light transmitted by them will have different colors.

The locking plates 6 and 7 may assume the constructional form shown in Fig. 4. In this case each plate is originally punched out so that the apertures thereof have an outward taper. As shown in Fig. 4, each plate 6' and 7' has its apertures provided with an inclined wall 10'. Each sphere 11 will, in that case, be snugly seated between the inwardly tapered walls of each pair of opposed apertures. The inner faces of the sheets 6' and 7' will be in contact at the sections 7" between apertures. When securely bolted together, this type of plate construction acts as if there were one plate with the spheres maintained in position by opposed tapered rings.

In operation, the screen 2 is viewed by looking at face 6. In Fig. 1 is shown the reproduction of the letter L on the screen. The light rays 12 falling on the rear face 7 illuminate certain of the globules 11. These globules act to concentrate the light; when viewed from face 6 each acts as a light point source. The illuminated globules, shown in Fig. 1 as in the L shaped area, reproduce an extremely brilliant image of the pattern or object 4' on film 4. When viewed closely in illuminated condition, it is seen that each globule 11 is providing a bright source of light; depending on the size of the globule the light will vary in brilliance. For small spheres 11, or by employing globules of the type shown in Figs. 5 and 6, the globules will provide point sources of light. Of course, a large size screen will be capable of reproducing many words arranged in sentence form. The spheres 11 which are not illuminated by light ray 12, appear dark when viewed from the face 6.

A negative film, or slide, 4 is preferred, because the images are then brilliantly reproduced on a dark background. For "still" reproduction (pictures or reading material) any desired type of negative slide or film may be used. For "animated" reproduction, black and white cartoons are highly suitable; although colored effects are satisfactorily reproduced by this screen. In the case of animated cartoons, or other moving picture film, negative film will be used, because in that way the figures will appear light, as they should be, on a dark background. It is to be understood that any type of film can be used for projection on the screen, and that the screen images may be viewed in daylight, or in the dark as at night or in a darkened room.

The present screen, and its associated projection system, is capable of a multitude of uses. Advertising on building fronts, in store windows, on roadways; in fact, any location where the attention of the passerby can be attracted. The advertising material can be animated or still; the material can be of the motion picture type. As pointed out above, in case of images requiring detail the spheres 11 will be of smaller diameter and be spaced closely together. The screen is not only easy to use, and highly attractive in appearance, but is assembled with facility. To assemble a screen of this type it is only necessary to distribute the spheres 11 over the inner face of one of the locking plates; the companion plate is then positioned over the spheres to register each sphere and its companion apertures. The bolts 9 are tightened along the frame, and over the plate 6. The screen is ready for use. It is to be clearly understood that the screen area is subject to a wide variation; the number of spheres per unit area will depend on the detail desired. The circumstances of use will determine the type of film to use, and the spacing between plate 7 and the projector.

The invention may be used for image reproduction without a projector. For example, the film 4" may be placed adjacent rear plate 7, as shown in Fig. 7. The light will issue from a strong light source 30; any well known parabolic reflector 31 may be used in such case to concentrate the light on the film 4". Only the spheres 11, illuminated by the light passing through the transparent portion of film 4", are shown in Fig. 7. It is to be understood that the remaining globular elements are dark; they are not shown to preserve simplicity of disclosure. It will be understood that the screen in Fig. 7 will be constructed as shown in Fig. 1 or Fig. 4; the film 4" may be moved relative to the exposed face of plate 7 by any desired mechanism. There will be conveyed in that case, as well as in Fig. 1, the impression of brilliantly glowing images moving across the screen face.

The term "pattern" is employed in this application to cover any letters, words or pictures which may be desired for reproduction of the screen 2.

While we have indicated and described several constructions for carrying our invention into effect, it will be apparent to one skilled in the art that our invention is by no means limited to the particular constructions shown and described, but that many modifications may be made without departing from the scope of our invention as set forth in the appended claims.

What we claim is:

1. In an illuminated screen, a pair of spaced parallel rigid plates, each plate being opaque and provided with a plurality of apertures arranged in vertical, horizontal and diagonal alignment, a transparent light concentration element of relatively small size positioned in registration between each pair of opposed apertures of said plates, the opaque area of the plate being sufficiently large to permit the opaque area surrounding the exposed surface of each element to function as a light mask, and means for compressing said elements between said plates whereby light can pass from one face of the screen to the other solely through said elements.

2. In an illuminated screen, a pair of spaced parallel plates, each plate being opaque and provided with a plurality of apertures arranged in vertical, horizontal and diagonal alignment, a light concentration element positioned in registration between each pair of opposed apertures of said plates, means operatively associated with the plates for compressing said elements between said plates, and each element being a glass sphere of relatively small diameter, the opaque area of at least one plate being large compared to the entire plate area whereby the opaque area surrounding the exposed surface of each glass sphere acts as a light mask.

3. In an illuminated screen, an opaque rigid plate having a plurality of apertures arranged in vertical, horizontal and diagonal alignment, a glass ball of relatively small diameter fixedly secured in each aperture having surfaces exposed on each face of the plate, the opaque area of the plate surrounding the exposed surface of each ball being sufficiently large so that it may act as a light mask, a source of light, and an object having transparent image areas between the light source and one face of the plate and light being transmitted from said one face to the opposite face solely through said balls.

4. In an illuminated screen, a pair of spaced parallel rigid plates, each plate being opaque and provided with a plurality of apertures arranged in vertical, horizontal and diagonal alignment, a transparent light concentration element of relatively small size positioned in registration between each pair of opposed apertures of said plates, the opaque area which surrounds the exposed surface of each element being sufficiently large to act as a light mask, means operatively associated with said plates for compressing said elements between said plates whereby light can pass from one face of the sign to the opposite face solely through said elements, a source of light, a film adjacent one plate face, the film having light transmitting areas, and said elements being spherical.

WILLIAM SCHWARTZ.
MURAY SCHWARTZ.